(12) United States Patent
Tamai et al.

(10) Patent No.: US 7,516,007 B2
(45) Date of Patent: Apr. 7, 2009

(54) ANTI-ROLLBACK CONTROL FOR HYBRID AND CONVENTIONAL POWERTRAIN VEHICLES

(75) Inventors: Goro Tamai, West Bloomfield, MI (US); Birendra P. Bhattarai, Novi, MI (US); Tony T. Hoang, Warren, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 531 days.

(21) Appl. No.: 11/233,841

(22) Filed: Sep. 23, 2005

(65) Prior Publication Data
US 2007/0073466 A1    Mar. 29, 2007

(51) Int. Cl.
*G06F 19/00* (2006.01)
(52) U.S. Cl. .......................................... 701/70; 701/22
(58) Field of Classification Search .................... 701/22, 701/70, 80, 38
See application file for complete search history.

(56) References Cited

U.S. PATENT DOCUMENTS 5,935,041 A * 8/1999 Tsukamoto et al. ........... 477/92
2004/0189081 A1 * 9/2004 Hardtle et al. ................. 303/1
2005/0143877 A1 * 6/2005 Cikanek et al. ............... 701/22
2007/0073466 A1 * 3/2007 Tamai et al. .................. 701/70
2007/0168103 A1 * 7/2007 Scelers ........................ 701/67

FOREIGN PATENT DOCUMENTS

| DE | 19581686 T | 5/1997 |
|----|------------|--------|
| DE | 10357993 | 10/2004 |
| DE | 10317501 | 11/2004 |
| DE | 102004025637 | 1/2005 |
| DE | 102004026722 | 1/2005 |
| JP | 2004169578 | 6/2004 |
| JP | 3635427 | 4/2005 |
| JP | 3700974 | 9/2005 |

* cited by examiner

*Primary Examiner*—Yonel Beaulieu

(57) ABSTRACT

An anti-rollback vehicle control system reduces vehicle rollback by restarting an engine based on a grade, a brake signal, and a calculated brake release rate. In a hybrid vehicle, the control system restarts the vehicle engine and electric motor. In a conventional powertrain vehicle that utilizes a transmission with a neutral-idle mode, the control system directs the transmission to exit neutral-idle mode. The grade may be estimated based on a vehicle acceleration rate, a vehicle driving force, and resistance factors.

20 Claims, 4 Drawing Sheets

ANTI-ROLLBACK CONTROL FOR HYBRID AND CONVENTIONAL POWERTRAIN VEHICLES

FIELD OF THE INVENTION

The present invention relates to vehicle control systems, and more particularly to a control system for reduction of vehicle rollback.

BACKGROUND OF THE INVENTION

When a vehicle is stopped on an incline, vehicle rollback may occur between release of a brake pedal and depression of an accelerator pedal. To conserve fuel and energy, a hybrid vehicle turns off an engine by cutting fuel delivery while a vehicle is stopped. The driver resumes vehicle travel by releasing the brake pedal and depressing the accelerator pedal. Typically, the engine is not restarted until the end of a brake pedal release stroke when the brake has been fully released. When the hybrid vehicle is stopped on an incline, a certain amount of brake pressure is necessary to hold the vehicle on the incline. During the brake pedal release stroke, prior to restarting of the engine, the brake pressure may become insufficient to hold the vehicle on the incline and vehicle rollback may occur.

Similarly, vehicle rollback may occur in a conventional powertrain vehicle which utilizes a neutral-idle mode. A transmission in such a vehicle is moved to neutral while the vehicle is stopped to conserve fuel and reduce idle vibration. When the vehicle is stopped on an incline, the vehicle is held by a brake system. Typically, the vehicle exits the neutral-idle mode and engages a vehicle clutch at the end of the brake pedal release stroke. Vehicle rollback may occur prior to the vehicle exiting neutral idle mode when the brake pressure is no longer sufficient to hold the vehicle on the incline.

SUMMARY OF THE INVENTION

Accordingly, the present invention provides a rollback reduction system for a vehicle having an engine. The rollback reduction system includes a grade sensor that generates a grade signal and a brake sensor that generates a brake signal. A control module calculates a brake release rate based on the brake signal and restarts the engine based on the grade signal and the brake release rate.

In one feature, the control module restarts the engine when the brake release rate is greater than a predetermined release rate.

In other features, the control module generates a filtered brake signal, calculates a brake-off threshold based on a moving average of the brake signal, and restarts the engine when the filtered brake signal is less than the brake-off threshold.

In another feature, the rollback reduction system restarts the engine by generating an engine restart signal. The engine restart signal is reset when the grade signal is less than a predetermined grade and when the brake signal is greater than a predetermined brake minimum.

Another embodiment of the rollback reduction system includes a brake sensor that generates a brake signal, a vehicle speed sensor that generates a speed signal, and an engine rotational speed sensor that generates an engine rotational speed sensor. The control module calculates a brake release rate based on the brake signal, an acceleration rate based on the speed signal, a braking force based on the brake signal, a driving force based on the engine rotational speed signal. The control module calculates a grade estimate based on a predetermined vehicle mass, the acceleration rate, the driving force, and the braking force. The control module restarts the engine based on the grade estimate and the brake release rate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and, the accompanying drawings, wherein.

DETAILED DESCRIPTION OF THE PREFERRED EMBODIMENTS

Figure 1:
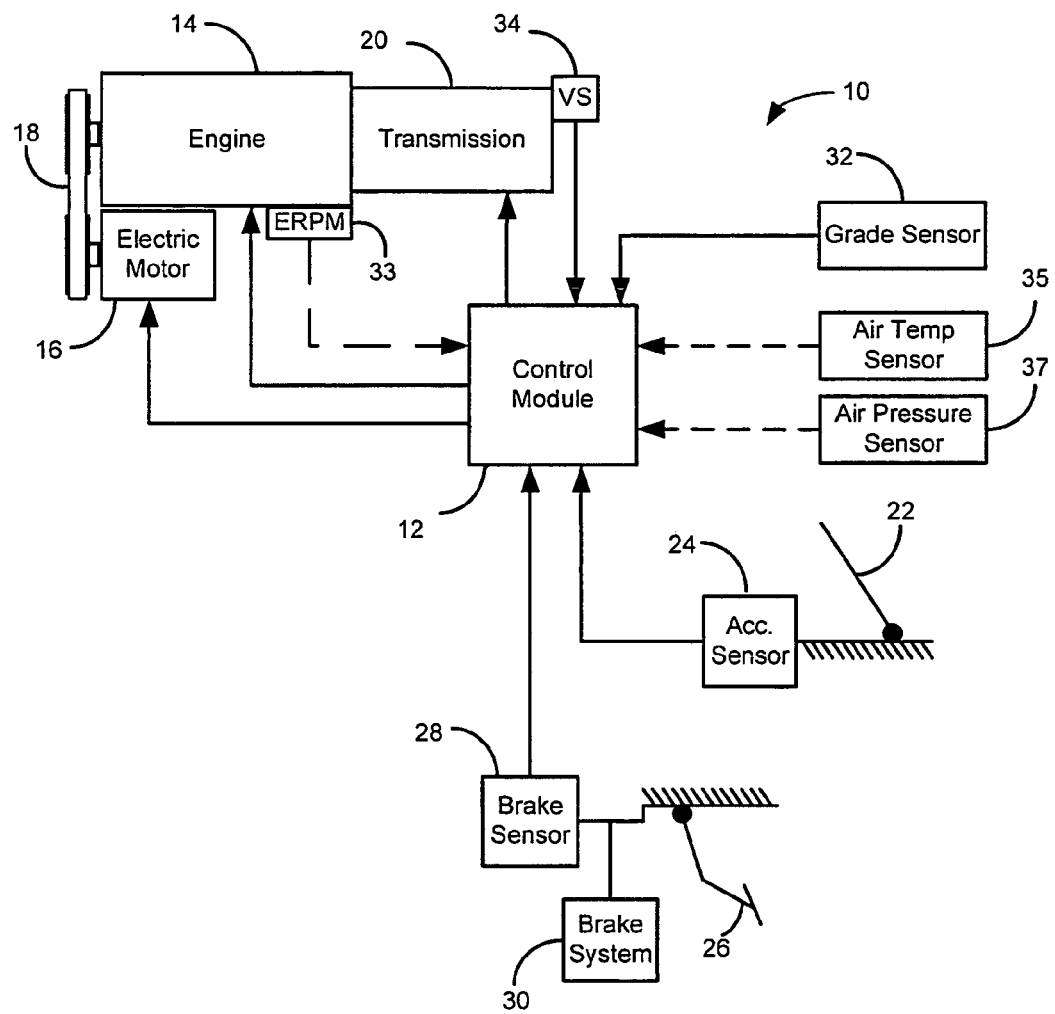
FIG. 1 is a schematic illustration of an exemplary hybrid vehicle that is operated based on a rollback reduction system according to the present invention.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a rollback reduction system 10 for a hybrid vehicle is shown. The rollback reduction system 10 may also be implemented in a conventional powertrain vehicle, as discussed below. A control module 12 regulates operation of an engine 14 and an electric motor 16. The control module 12 controls fuel injection and spark to selectively turn off and restart the engine 14. The control module 12 also controls an electric motor 16. The engine 14 and the electric motor 16 are coupled via a belt-alternator-starter system 18. The electric motor may also be coupled to the engine by a chain drive, a clutch system, or other device. The electric motor 16 supplements the engine 14 to produce drive torque to a transmission 20 which in turn produces drive torque to the drive shaft (not shown), which drives wheels of the vehicle. To restart the engine 14, the electric motor 16 is rotated at a speed sufficient to allow the engine 14 to start.

In a conventional powertrain vehicle, the drive torque is provided by the engine 14 alone. In a vehicle rollback reduction system 10 implemented in a conventional powertrain vehicle, the control module 12 regulates the mode of the transmission 20. In neutral-idle mode, the transmission 20 is shifted into neutral. Upon exiting neutral-idle mode, the clutch is reapplied.

In use, an accelerator pedal 22 is operated by the driver. An accelerator sensor 24 senses a position of the accelerator pedal 22 and generates an accelerator signal that is received by the control module 12. A brake pedal 26 is also operated by the driver. A brake sensor 28 senses application of force on the brake pedal 26. The brake sensor 28 generates a brake signal (BRK) that corresponds to the application of force on the brake pedal 26 and that is received by the control module 12. The brake pedal 26 may be connected to a brake system 30. In an alternate embodiment, the control module 12 may control the brake system 30.

The brake system 30 is subject to brake wear caused by use of the brake system 30 over time. The brake sensor 28 may comprise a brake pressure sensor that is sensitive to the amount of brake pressure being applied to the brake pedal 26 by the driver. A brake pressure sensor provides a brake signal that is independent of brake wear. The brake pressure sensor provides a brake signal that corresponds to a percentage of the maximum possible brake pressure. Alternatively, the brake sensor 28 may comprise a brake pedal position sensor that is sensitive to the displacement of the brake pedal 26 by the driver. A brake pedal position sensor provides a brake signal that is dependent on brake wear. The brake pedal 26 displacement required to achieve a desired braking effect will increase as the brake system 30 suffers brake wear. For this reason, the brake pressure sensor may be preferable to the brake pedal position sensor.

A vehicle speed sensor 34 generates a vehicle speed signal (VS), which is received by the control module 12. The vehicle speed sensor 34 may be connected to the transmission 20. The vehicle speed sensor 34 may alternately be connected to other vehicle components, such as the wheels, the anti-lock brake system, etc., to generate VS.

A grade sensor 32 generates a grade signal (Grade), which corresponds to the degree of inclination of the vehicle. The grade sensor 32 may comprise an inclinometer. The control module 12 receives the grade signal from the grade sensor 32.

In an alternate embodiment, the grade may be estimated by the control module 12 based on the formula Force=Mass× Acceleration. In such an embodiment, grade is estimated based on the vehicle mass (M), vehicle acceleration (A), vehicle driving force ($F_{Drive}$), and resistance factors. Resistance factors may include a predetermined rolling resistance force ($F_{Rolling}$), and an aerodynamic resistance force ($F_{Aero}$). The mass of the vehicle multiplied by vehicle acceleration (M×A) is equal to the sum of the forces acting on the vehicle, including the gravitational force exerted on the vehicle as a result of the current grade ($F_{Grade}$). Thus, $F_{Grade}$ may be estimated based on the formula:

$$M \times A = F_{Drive} - F_{Grade} - F_{Aero} - F_{ROlling} - F_{Brake}$$

Or (solving for $F_{Grade}$):

$$F_{Grade} = F_{Drive} - F_{Aero} - F_{Rolling} - F_{Brake} - (M \times A)$$

where $F_{Brake}$ is the brake application force, calculated based on the brake signal. A is calculated based on VS. A is a positive number when the vehicle is accelerating, and a negative number when the vehicle is decelerating.

$F_{Drive}$ is calculated according to the following formula:

$$F_{Drive} = T_{Drive}/RR$$

where $T_{Drive}$ is the drive wheel torque and RR is the tire effective rolling radius. $F_{Rolling}$, RR, and M are constants for a given vehicle. $T_{Drive}$ is based on a rotational speed of the engine (ERPM), which is generated by an engine rotational speed sensor 33. ERPM is received by the control module 12 (shown by dashed line in FIG. 1).

$F_{Aero}$ is calculated based on the following formula:

$$F_{Aero} = Veh._{Drag} \times Veh._{FrontalArea} \times VS^2 \times P$$

where $Veh_{Drag}$ is a predetermined vehicle drag coefficient, $Veh._{FrontalArea}$ is a predetermined projected frontal area of the vehicle, VS is described above, and P is the air density.

Air density is estimated based on air temperature and air pressure. The control module 12 receives an air temperature signal generated by an air temperature sensor 35 and an air pressure signal that is generated by an air pressure sensor 37 (shown by dashed line in FIG. 1). The air temperature sensor 35 and the air pressure sensor 37 may be located in the intake manifold (not shown) or at other suitable locations.

Once $F_{Grade}$ is calculated, the grade estimate may be calculated based on the following formula:

$$\sin(grade) = F_{Grade}/(M*G),$$

where $F_{Grade}$ and M are described above, and G is the gravitational constant (9.8 m/s$^2$).

The control module 12 restarts the engine 14 based on an engine restart signal (ERS). ERS is based upon BRK, Grade (or the grade estimate), VS, and a brake pedal release rate, which is calculated based on BRK When ERS is generated (i.e., when the ERS is set to on) in a hybrid vehicle, the control module 12 restarts the engine and creates forward drive torque by increasing the target RPM of the engine 14 and/or electric motor 16. When ERS is generated in a conventional powertrain vehicle, the transmission 20 exits neutral-idle mode. These steps are taken despite the fact that the brake pedal 26 may remain somewhat depressed and despite the fact that the accelerator pedal 22 may not yet be depressed.

Figure 2:
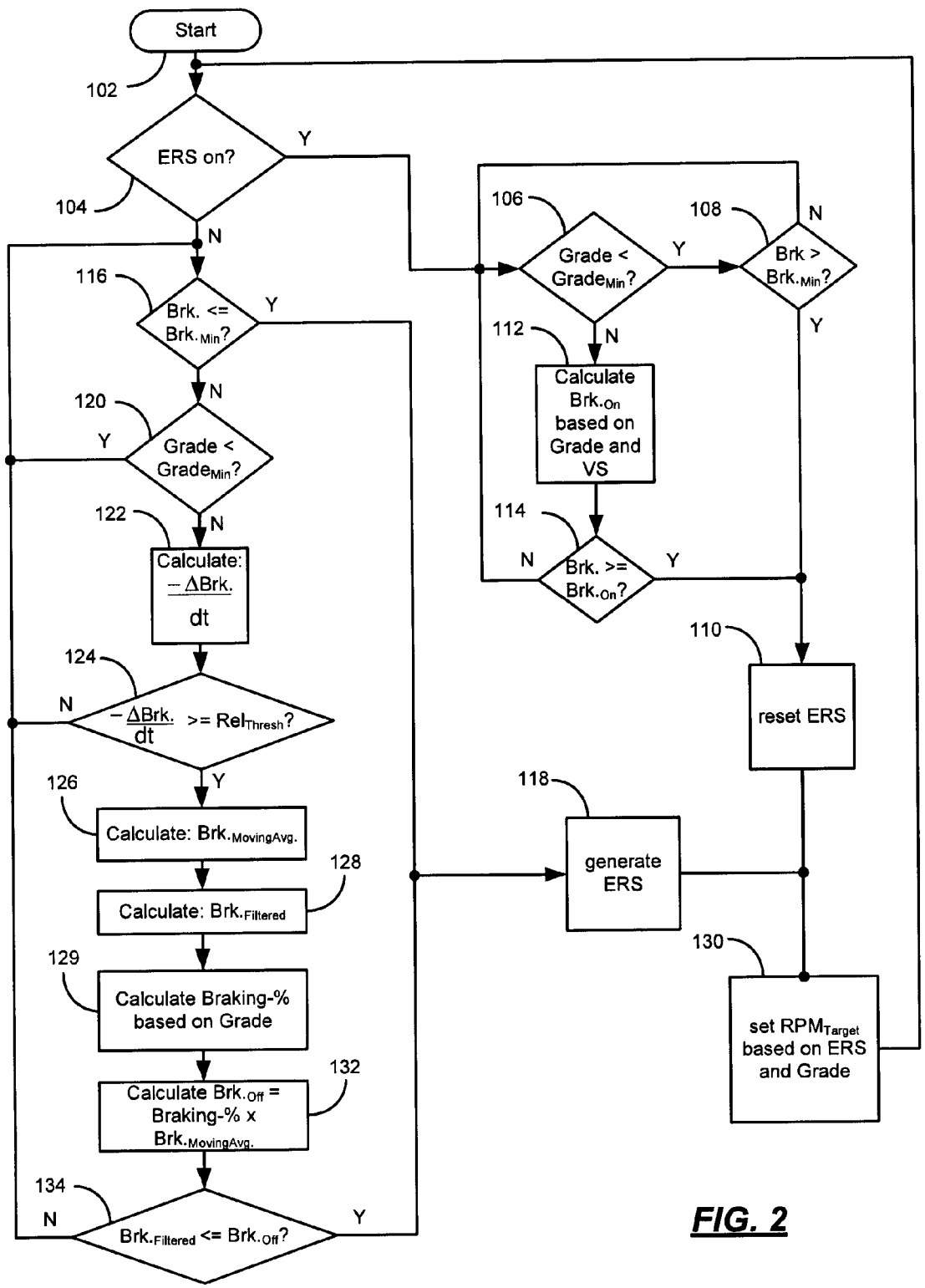
FIG. 2 is a flowchart illustrating steps performed by the rollback reduction system to generate and reset an engine restart signal according to the present invention.

Referring now to FIG. 2, steps for generating and resetting ERS are shown. Control begins with step 102. In step 104, control determines whether ERS is on. When ERS is on, control determines whether ERS should be reset starting with step 106. In step 106, control determines whether Grade (or grade estimate) is less than a predetermined minimum grade ($Grade_{Min}$). $Grade_{min}$ is chosen to correspond to a grade that is relatively flat. When Grade is less than $Grade_{Min}$, control determines whether BRK is greater than a predetermined brake minimum ($BRK_{Min}$) in step 108. When BRK is greater than $BRK_{Min}$, the brake pedal 26 is being depressed and control resets ERS in step 110 by setting ERS to off. When BRK is not greater than $BRK_{Min}$, control loops back to step 106.

In step 106, when control determines that Grade is not less than $Grade_{Min}$, control proceeds to step 112. In step 112, control calculates a Brake-on threshold ($BRK_{On}$) as a function of Grade and VS. $BRK_{On}$ may be determined by reference to a tabulated lookup table saved in a memory device (not shown) accessible by the control module 12. An exemplary lookup table for $BRK_{On}$ is set forth in Table 1 below. Grade is given as a percentage, such that 0% represents horizontal, and 100% represents vertical. $BRK_{On}$ is given as a percentage, such that 0% represents no braking by the driver, and 100% represents maximum braking by the driver. Table 1 is configured for use with a brake sensor 28 which utilizes a brake pressure sensor rather than a brake pedal position sensor.

TABLE 1

BRK$_{On}$ Lookup Table

| Grade | Vehicle Speed (Kph) | | |
|---|---|---|---|
| | 0 | 25 | 50 |
| 0% | 2 | 2 | 2 |
| 4% | 4 | 3 | 3 |
| 8% | 6 | 5 | 4 |
| 12% | 8 | 6 | 5 |
| 16% | 10 | 8 | 6 |

Control determines whether BRK is greater than or equal to BRK$_{On}$ in step 114. When BRK is greater than or equal to BRK$_{On}$, control resets ERS in step 110. When BRK is not greater than or equal to BRK$_{On}$, control loops back to step 106. As an example, when the vehicle is traveling on a grade of 8%, at a speed of 25 Kph, and the driver applies 5% of the maximum brake pressure, ERS is reset.

In step 104, when ERS is off, control determines whether to generate ERS starting with step 116. In step 116, when BRK is less than or equal to BRK$_{Min}$, the brake pedal 26 is not being depressed and control generates ERS, by setting ERS to on in step 118. When BRK is not less than or equal to BRK$_{Min}$, control determines whether Grade is less than Grade$_{Min}$ in step 120. In step 120, when Grade is less than Grade$_{Min}$, control loops back, to step 116. In this way, when Grade is less than Grade$_{Min}$, ERS is not generated unless BRK is less than or equal to BRK$_{Min}$.

In step 120, when Grade is not less than Grade$_{Min}$, control calculates the brake release rate in step 122, according to the following formula:

brake release rate=−ΔBRK/dt, where ΔBRK is the change in BRK, and dt is the change in time.

When the brake pedal 26 is being released, BRK will decrease, and ΔBRK/dt will be a negative number. When the brake pedal 26 is released slowly, ΔBRK/dt will be a relatively small negative number, and the brake release rate will be a relatively small positive number. When the brake pedal 26 is released quickly, ΔBRK/dt will be a relatively large negative number, and the brake release rate will be a relatively large positive number. Control compares −ΔBRK/dt to a predetermined release rate threshold (Rel.$_{Thresh}$) in step 124. When −ΔBRK/dt is greater than or equal to Rel.$_{Thresh}$, the brake pedal 26 is being released at a rapid rate, and control proceeds to step 126. When −ΔBRK/dt is not greater than or equal to Rel.$_{Thresh}$, the brake pedal 26 is not being released at a rapid rate, and control loops back to step 116.

In step 126, control calculates the moving average of BRK (BRK$_{MovingAvg}$). BRK$_{MovingAvg}$ is the average of BRK over a predetermined time interval. The time interval may be a predetermined number of clock cycles, such as 12 clock cycles. In such case, BRK$_{MovingAvg}$ is the average of BRK over the 12 most recent clock cycles.

In step 128, control calculates a filtered brake pressure (BRK$_{Filtered}$). If the driver depresses the brake pedal 26 with a "fidgety foo" in an unsteady manner, then the BRK will not be stable. To counter the fidgety foot, BRK is debounced or filtered in step 128. Control filters BRK by calculating the moving average of BRK over a relatively short time interval. BRK$_{Filtered}$ may be calculated as the moving average of the BRK over 1 clock cycle.

Control then calculates a braking percentage (Braking-%) in step 129. Braking-% is a function of Grade, and increases as Grade increases. Braking-% may be determined from a lookup table. On a steep incline Braking-% may be 85%. On a less steep incline Braking-% may be 75%. In an alternate embodiment, Braking-% may be a predetermined percentage, such as 80%, for all grades.

Control calculates a brake-off threshold (BRK$_{Off}$) in step 132 according to the following formula:

BRK$_{Off}$=Braking-%×BRK$_{MovingAvg}$, where Braking-% and BRK$_{MovingAvg}$ were calculated in previous steps 126 and 129. BRK$_{Off}$ corresponds to the point during the brake release stroke when ERS is generated.

Control compares BRK$_{Filtered}$ with BRK$_{Off}$ in step 134. When BRK$_{Filtered}$ is less than or equal to BRK$_{Off}$, control generates ERS in step 118. Otherwise, control loops back to step 116. In this way, ERS is generated in two instances: (1) when BRK is less than or equal to BRK$_{Min}$ in step 116; and (2) when −ΔBRK/dt is greated than or equal to Rel.$_{Thresh}$ in step 124, and BRK$_{Filtered}$ is less than or equal to BRK$_{Off}$ in step 134.

After control generates or resets ERS in steps 118 or 110, control sets the target RPM (RPM$_{Target}$) for the engine 14 and electric motor 16 based on ERS and Grade in step 130. Control then loops back to step 104.

Figure 3:
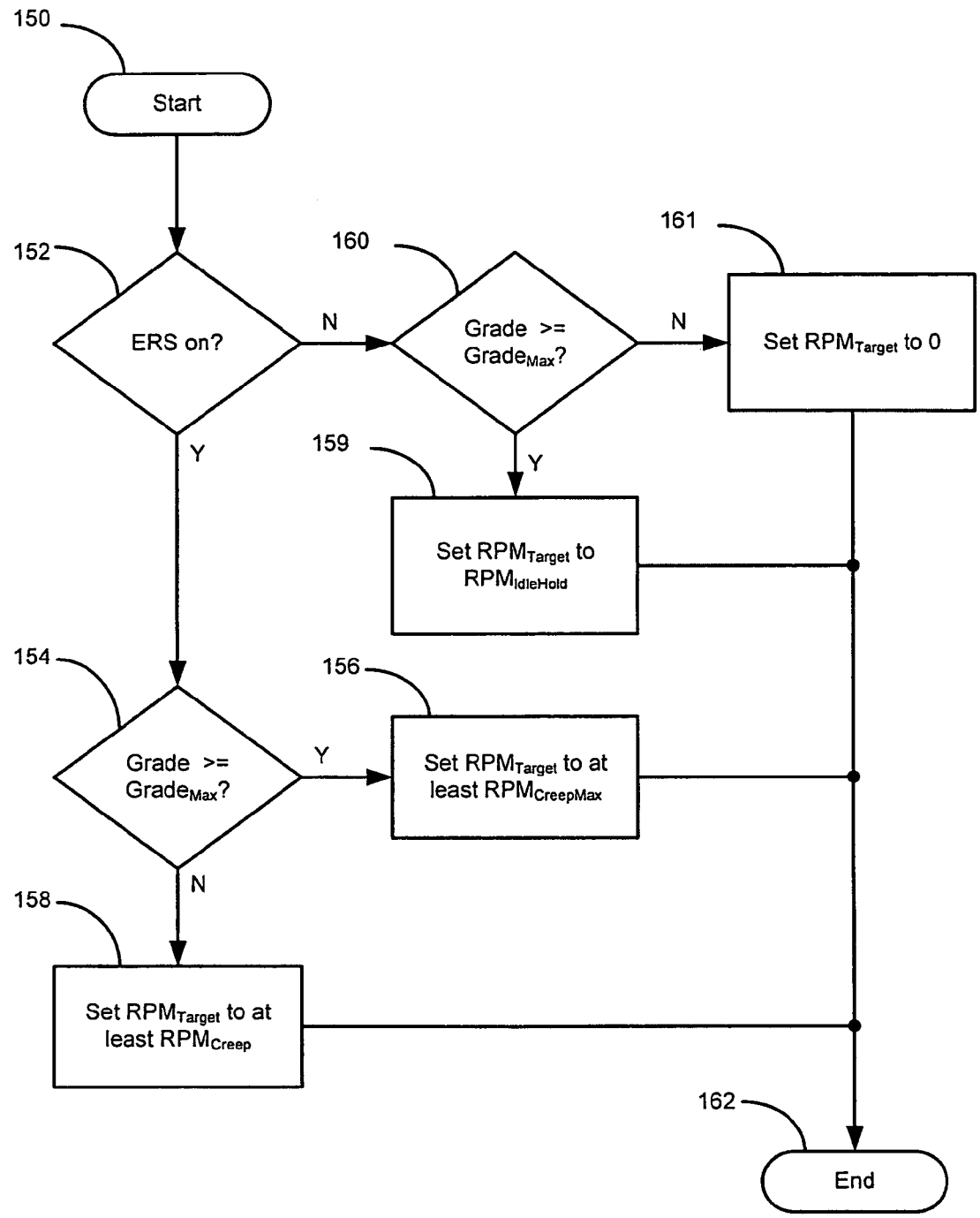
FIG. 3 is a flowchart illustrating steps performed by the rollback reduction system to set a target RPM for an engine according to the present invention.

Referring now to FIG. 3, the steps for setting RPM$_{Target}$ based on ERS and Grade are shown. It is understood that the steps described in FIG. 3 are encapsulated in step 130 of FIG. 2. Control begins with step 150. Control determines whether ERS is on in step 152. When ERS is on, control determines whether Grade is greater than or equal to a predetermined maximum grade (Grade$_{Max}$) in step 154. Grade$_{Max}$ corresponds to a relatively steep grade. When Grade is greater than or equal to Grade$_{Max}$, control sets RPM$_{Target}$ to at least RPM$_{CreepMax}$ in step 156. RPM$_{CreepMax}$ corresponds to the RPM necessary for the engine 14 and electric motor 16 (or the engine 14 alone in a convention powertrain vehicle) to creep the vehicle forward on an incline greater than or equal to Grade$_{Max}$. When control determines in step 154 that Grade is not greater than or equal to Grade$_{Max}$, then control sets RPM$_{Target}$ to at least RPM$_{Creep}$, where RPM$_{Creep}$ corresponds to the RPM necessary to creep the vehicle forward on an incline less than Grade$_{Max}$. In step 156 and 158, if RPM$_{Target}$ is already set to a level higher than RPM$_{CreepMax}$ or RPM$_{Creep}$, respectively, then RPM$_{Target}$ would remain at that higher level. In a conventional powertrain vehicle, in step 156 and 158 control also directs the transmission 20 to exit neutral-idle mode.

In step 152, when control determines that ERS is off, control determines whether Grade is greater than or equal to Grade$_{Max}$ in step 160. When Grade is greater than or equal to Grade$_{Max}$, control sets RPM$_{Target}$ to RPM$_{IdleHold}$ in step 159. RPM$_{IdleHold}$ is the RPM necessary to provide a sufficient amount of torque to the transmission 20 and drive shaft to hold the vehicle on the current incline. When control determines in step 160 that Grade is not greater than or equal to Grade$_{Max}$, then control turns the engine off by setting RPM$_{Target}$ to 0 in step 161. After RPM$_{Target}$ has been set 156, 158, 159, and 161, control ends in step 162.

In a conventional powertrain vehicle, Control may direct the transmission to enter neutral-idle mode in step 161. Likewise, control may direct the transmission to exit neutral-idle mode in steps 156 and 158.

It is understood that the description of the manner in which control sets RPM$_{Target}$ contained in FIG. 3 is exemplary only, and that a number alternate embodiments exist. For example, RPM$_{Target}$ could be set based on ERS only. In such an embodiment RPM$_{Target}$ would be 0 when ERS is reset and RPM$_{Creep}$ when ERS is generated.

Figure 4:
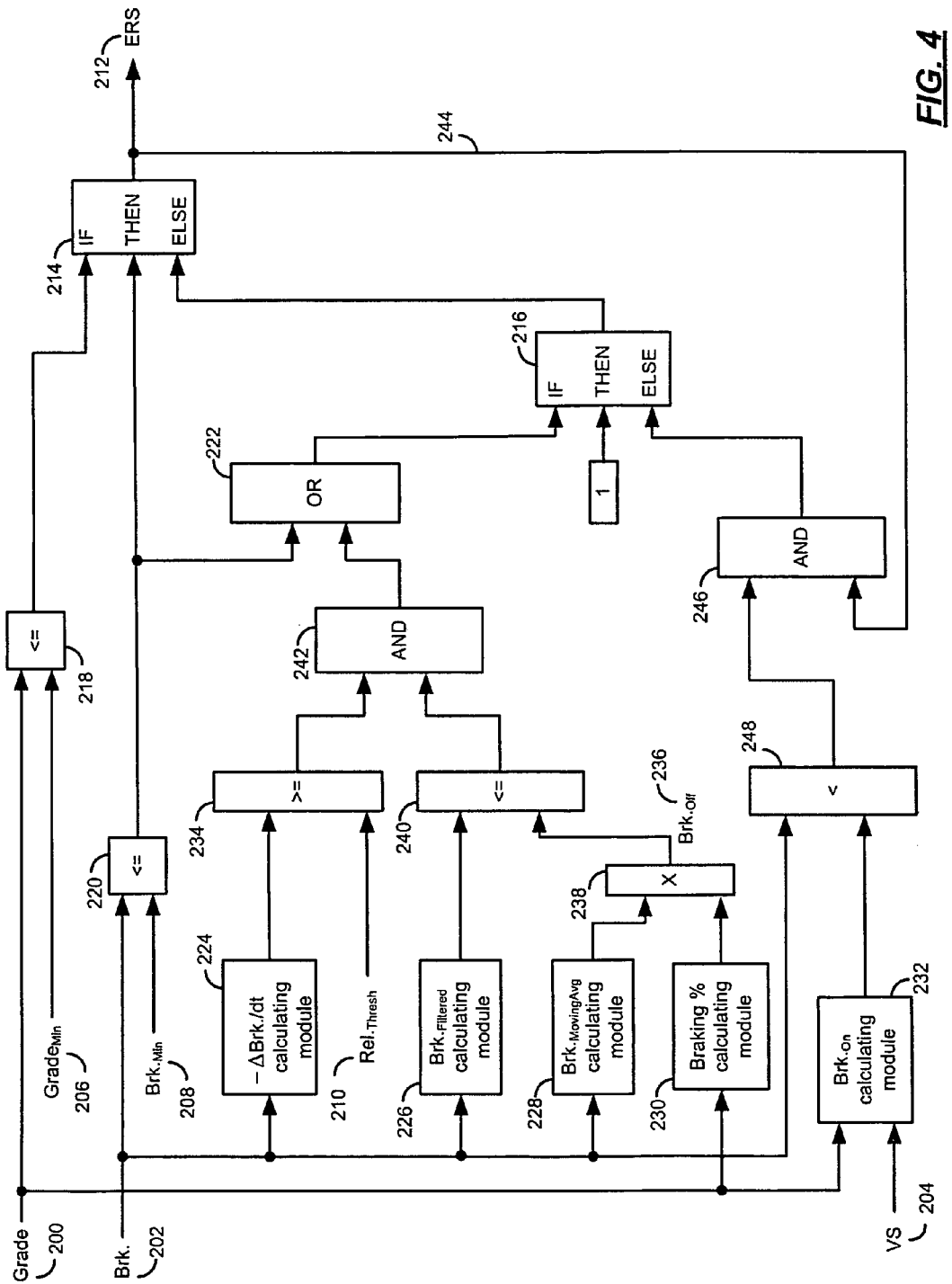
FIG. 4 is a signal flow diagram illustrating the generation of the engine restart signal according to the present invention.

Referring now to FIG. 4, a signal flow diagram illustrates the signal processing executed by the control module 12 to generate and reset ERS. Variable input signals include: Grade 200, which is received from the grade sensor 32 (or estimated by the control module 12); BRK 202, which is received from the brake sensor 28; and the VS 204, which is received from the vehicle speed sensor 34. In addition, predetermined input signals include: Grade$_{Min}$ 206, BRK$_{Min}$ 208, and Rel.$_{Thresh}$ 210. The output includes ERS 212.

Two "if-then-else" modules 214, 216 are utilized. In general, an If-then-else module is configured with three inputs: an "if" input, a "then" input, and an "else" input. When the "if" input is on, the output is the same as the "then" input. Otherwise, the output is the same as the "else" input.

The output of a first if-then-else module 214 corresponds to ERS 212. The output signal of a comparator module 218 is on when Grade 200 is less than or equal to Grade$_{Min}$ 206. In such case, ERS 212 corresponds to the output of a comparator module 220. The comparator module 220 is on when BRK 202 is less than or equal to BRK$_{Min}$ 208. If Grade 200 is not less than or equal to Grade$_{Min}$ 206, then the output of the comparator module 218 is off, and ERS 212 corresponds to the output of the other if-then-else module 216. When the "if" input of the second if-then-else module 216 is on, then ERS 212 is on as well.

When BRK 202 is less than or equal to BRK$_{Min}$ 208, the output of an Or module 222 is on, and the "if" input of the second if-then-else module 216 is on, as well as the ERS 212. BRK 202 is received by the −ΔBRK/dt calculating module 224, the BRK$_{Filtered}$ calculating module 226, and the BRK$_{MovingAvg}$ calculating module 228. Grade 200 is received by the Braking-% calculating module 230 and the BRK$_{On}$ calculating module 232.

BRK$_{Off}$ 236 corresponds to the output of a multiplier module 238, which multiplies BRK$_{MovinAvg}$, as determined by the BRK$_{MovingAvg}$ calculating module 228, by Braking-%, as determined by the Braking-% calculating module 230. When −ΔBRK/dt, is greater than or equal to Rel.$_{Thresh}$ 210, as determined by comparator module 234, and when BRK$_{Filtered}$ is less than or equal to BRK$_{Off}$ 236, as determined by comparator module 240, the output of an And module 242, as well as ERS 212, will be set to on.

A feedback signal 244 is received by a second And module 246. When BRK 202 is greater than or equal to BRK$_{On}$, as determined by comparator 248, the output of the And module 246 is off, as well as ERS 212.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A rollback reduction system in a vehicle having an engine, comprising:
a grade sensor that generates a grade signal;
a brake sensor that generates a brake signal; and
a control module that calculates a brake release rate based on said brake signal and starts said engine based on said grade signal and said brake release rate.

2. The rollback reduction system of claim 1 wherein said control module starts said engine when said brake release rate is greater than a predetermined release rate.

3. The rollback reduction system of claim 2 wherein said control module generates a filtered brake signal, calculates a brake-off threshold based on a moving average of said brake signal and starts said engine when said filtered brake signal is less than said brake-off threshold.

4. The rollback reduction system of claim 3 wherein said brake-off threshold is a predetermined percentage of said moving average.

5. The rollback reduction system of claim 3 wherein said control module calculates a braking-percentage based on said grade signal and wherein said brake-off threshold is based on said braking-percentage and said moving average.

6. The rollback reduction system of claim 1 wherein said control module starts said engine when said grade signal is less than a predetermined grade and said brake signal is less than a predetermined brake minimum.

7. The rollback reduction system of claim 1 wherein said control module starts said engine by generating an engine restart signal.

8. The rollback reduction system of claim 7 wherein said control module resets said engine restart signal when said grade signal is less than a predetermined grade and when said brake signal is greater than a predetermined brake minimum.

9. The rollback reduction system of claim 7 further comprising a vehicle speed sensor that generates a speed signal, wherein said control module calculates a brake-on threshold based on said grade signal and said speed signal and resets said engine restart signal when said grade signal is greater than a predetermined grade and said brake signal is greater than said brake-on threshold.

10. The rollback reduction system of claim 1 wherein when said vehicle is stopped, said control module sets a target RPM for said engine based on said grade signal to hold said vehicle without rollback.

11. The rollback reduction system of claim 10 wherein when said control module starts said engine, said control module sets said target RPM for said engine based on said grade signal to creep said vehicle forward.

12. A system comprising the vehicle rollback reduction system of claim 1 and further comprising an electric motor coupled to said engine, wherein when said control module starts said engine said control module sets a target RPM for said electric motor.

13. A system comprising the vehicle rollback reduction system of claim 1 and further comprising a transmission with a neutral idle mode wherein when said control module starts said engine said transmission exits neutral idle mode.

14. A rollback reduction system in a vehicle having an engine, comprising:
a brake sensor that generates a brake signal;
a vehicle speed sensor that generates a speed signal;
an engine rotational speed sensor that generates an engine rotational speed signal; and
a control module that calculates a brake release rate based on said brake signal, an acceleration rate based on said speed signal, a driving force based on said engine rotational speed signal, a braking force based on said brake signal, and a grade estimate based on a predetermined vehicle mass, said acceleration rate, said driving force, and said braking force and that starts said engine based on said grade estimate and said brake release rate.

15. The rollback reduction system of claim 14 wherein said control module calculates an aerodynamic resistance force based on said speed signal, and calculates said grade estimate based on said aerodynamic resistance force and a predetermined rolling resistance force.

16. The rollback reduction system of claim 15 further comprising an air temperature sensor that generates an air temperature signal and an air pressure sensor that generates an air pressure signal wherein said control module calculates an air density based on said air temperature signal and said air pressure signal and calculates said aerodynamic resistance force based on a predetermined frontal area, a predetermined vehicle drag coefficient, and said air density.

17. A method for reducing rollback of a vehicle having an engine, said method comprising:
 determining a grade;
 receiving a brake signal;
 calculating a brake release rate based on said brake signal; and
 starting said engine based on said grade and said brake release rate.

18. The method for reducing rollback of claim 17 further comprising:
 calculating a filtered brake signal based on said brake signal;
 calculating a brake-off threshold based on said grade and a moving average of said brake signal;
 starting said engine when said brake release rate is greater than a predetermined release rate and said filtered brake signal is less than said brake-off threshold.

19. The method for reducing rollback of claim 17 further comprising setting an engine target RPM based on said grade to hold said vehicle without rollback when said vehicle is stopped and to creep said vehicle forward when said engine is started.

20. The method for reducing rollback of claim 17 wherein said determining a grade comprises:
 calculating a vehicle acceleration based on a vehicle speed, a vehicle driving force based on an engine rotational speed, a braking force based on said brake signal and an aerodynamic resistance based on said vehicle speed, a predetermined vehicle frontal area, and a vehicle drag coefficient; and
 estimating said grade based on a predetermined vehicle mass, said vehicle acceleration, said vehicle driving force, said aerodynamic resistance, a predetermined rolling resistance, and said braking force.

* * * * *